United States Patent
Mueller et al.

(10) Patent No.: US 7,504,160 B2
(45) Date of Patent: Mar. 17, 2009

(54) SLIDING BODY AND PROCESS FOR PRODUCING A SLIDING BODY, AND ITS USE

(75) Inventors: Hilmar Mueller, Bellenberg (DE); Klaus Ohla, Illerkirchberg (DE); Michael Scharf, Dietenheim (DE)

(73) Assignee: Wieland-Werke AG, Ulm (DE)

( * ) Notice: Subject to any disclaimer, the term of this patent is extended or adjusted under 35 U.S.C. 154(b) by 328 days.

(21) Appl. No.: 11/228,009

(22) Filed: Sep. 15, 2005

(65) Prior Publication Data
US 2006/0070466 A1 Apr. 6, 2006

(30) Foreign Application Priority Data
Sep. 15, 2004 (DE) .................. 10 2004 044 519

(51) Int. Cl.
*B32B 3/02* (2006.01)
*B32B 15/01* (2006.01)
*B32B 15/18* (2006.01)
*B32B 15/20* (2006.01)

(52) U.S. Cl. .................. 428/677; 428/684; 428/612
(58) Field of Classification Search .................. None
See application file for complete search history.

(56) References Cited

U.S. PATENT DOCUMENTS

| | | | | |
|---|---|---|---|---|
| 5,864,745 | A * | 1/1999 | Kawagoe et al. | 428/553 |
| 5,875,702 | A * | 3/1999 | Kawagoe et al. | 92/12.2 |
| 6,123,009 | A * | 9/2000 | Kanayama et al. | 92/71 |
| 6,136,103 | A * | 10/2000 | Boegel et al. | 148/433 |
| 6,346,215 | B1 * | 2/2002 | Boegel et al. | 420/470 |
| 6,378,415 | B1 * | 4/2002 | Sugiura et al. | 92/71 |
| 6,457,399 | B1 * | 10/2002 | Jingu | 92/71 |
| 7,128,468 | B2 * | 10/2006 | Sumi et al. | 384/107 |
| 2002/0071619 | A1 * | 6/2002 | Tabuti et al. | 384/420 |
| 2003/0106879 | A1 * | 6/2003 | VanOtteren et al. | 219/93 |

(Continued)

FOREIGN PATENT DOCUMENTS

DE 2 025 169 12/1971

(Continued)

OTHER PUBLICATIONS

JP 2002-357186 English Machine Translation , Osamu et al, Dec. 2002.*

*Primary Examiner*—Jennifer McNeil
*Assistant Examiner*—Jason L Savage
(74) *Attorney, Agent, or Firm*—Flynn, Thiel, Boutell & Tanis, P.C.

(57) ABSTRACT

The invention relates to a process for producing a sliding body made up of a base body and a slide plate with a running surface arranged on the base body, wherein the slide plate and the base body are joined to one another by capacitor discharge welding. It is preferable for sliding bodies of this type to be used as a sliding shoe for hydrostatic piston engines.

The running surface of the slide plate is made of a nonferrous-metal sliding bearing material produced by spray-compacting and, in particular, is made of a copper-tin-titanium alloy produced by spray-compacting and contains 13.5 to 20% by weight of tin, 0.05 to 0.5% by weight of titanium, remainder copper and optionally one or more of the elements selected from silicon, chromium and zirconium up to a total amount of 1.0% by weight, plus inevitable impurities.

7 Claims, 1 Drawing Sheet

U.S. PATENT DOCUMENTS

| | | | |
|---|---|---|---|
| 2003/0111511 A1* | 6/2003 | Kanayama et al. | 228/101 |
| 2005/0051975 A1* | 3/2005 | Takayama et al. | 277/650 |
| 2005/0069448 A1* | 3/2005 | Sato et al. | 419/8 |
| 2007/0009757 A1* | 1/2007 | Takayama et al. | 428/644 |

FOREIGN PATENT DOCUMENTS

| | | |
|---|---|---|
| GB | 1 355 325 | 6/1974 |
| JP | 2002-357186 | * 12/2002 |

* cited by examiner

SLIDING BODY AND PROCESS FOR PRODUCING A SLIDING BODY, AND ITS USE

FIELD OF THE INVENTION

The invention relates to a process for producing a sliding body and to a sliding body, comprising a base body and a slide plate with a running surface arranged on the base body, and also to the use of the sliding body.

BACKGROUND OF THE INVENTION

The transmission of force from the diesel engine to the wheels and working devices in earth-moving machines, for example dredgers or cranes, is performed by what are known as hydrostatic drives. In swash plate pumps which are often used as the drive, the torque from the crank shaft is transmitted via a swash plate with a variable setting angle to reciprocating pistons. The pistons are positioned in a rotating cylinder housing. A sliding connection to the stationary swash plate by means of a sliding shoe, commonly known in the art as a slipper, effects a reciprocating movement of the pistons with each revolution. The stroke is determined by the respective setting angle of the swash plate. The pistons which are driven in this way are responsible for building up pressure in pressurized oil lines, via which in turn a hydraulic motor can be driven.

Whereas the diesel engine generally operates in nominal load mode, the pressure which is transmitted can be continuously varied within certain limits by setting an inclined position of the swash plate and by means of the altered reciprocating strokes on the part of the pistons which result.

In drive mechanisms, the primary objective is to increase the power density. This also increases the demands imposed on the strength and emergency running properties of the slippers, since the power has to be applied at higher rotational speeds and higher pressures. Increasing the pressures increases the specific loads and consequently the stresses on the sliding surfaces. On account of the increase in the centrifugal forces associated with higher rotational speeds, all the rotating components have to be of more lightweight design. This can be achieved, for example, by minimizing the component size.

The demands imposed with regard to increasing the load-bearing capacity at the slipper are primarily satisfied by materials such as coated steel, but also by some high-strength brasses. In practice, either sliding shoes made from steel, onto the running surface of which a bronze with a high lead content has been cast, or sliding shoes which consist entirely of high-strength brasses are often used.

Steel slippers have high strength, depending on the grade of steel. They represent a preferred material for the base body. The poor tribological properties can be improved by casting cast bronzes with a high lead content onto the running surface. One drawback in this context is the cast structure with a low strength of the sliding layer which is formed by the casting-on process.

Corresponding slippers are described, for example, in document GB 1 355 325. The document discloses an axial piston pump or motor which comprises a slipper with friction-reducing layers at the contact surfaces between slippers and ball of the joint. These friction-reduced layers are metallically joined to the slippers, for example by friction welding, plating or by means of powder metallurgy. Intermediate layers of molybdenum may also be used.

Slippers for hydrostatic piston engines are also known from document DE-A 2 025 169; these slippers are supposed to be less susceptible to major temperature fluctuations in operation and to have good sliding properties. For this purpose, a layer of the same material as the slide plate is arranged fixedly on a surface of a slipper which faces the slide plate, so that disadvantageous convex bowing of the slide plate which otherwise occurs as a result of a corresponding arrangement of materials with different expansion coefficients can be substantially avoided.

SUMMARY OF THE INVENTION

The invention is based on the object of providing a process for producing a sliding body and also a sliding body itself which has tribological and mechanical properties which are improved by virtue of the material combination used.

The invention is provided with regard to the process for producing a sliding body and with regard to a sliding body with specified features and with regard to the use of the sliding body. The invention further relates to advantageous refinements and developments.

With regard to a process for producing a sliding body comprising a base body and a slide plate with a running surface arranged on the base body, the invention encompasses the technical teaching of joining the slide plate and the base body to one another by means of capacitor discharge welding.

The joining process for joining the slide plate to the base body is of particular importance. There should be minimal disruption to the microstructure in the joining region between the running surface of the proposed tin bronze and the base body made from steel.

In this context, the invention is based on the consideration that a locally tightly restricted heat-affected zone of a few micrometers is formed in this joining process. Only the amount of energy which is required for welding is applied to the joining location. The surrounding matrix remains unaffected and there is no drop in hardness resulting from excessively high temperatures being used during joining. On account of the low introduction of heat, a favorable weld metal microstructure is established and a narrow heat-affected zone is formed. The heat-affected zone is limited in particular by an extremely short joining time in the region of approximately 10 ms and a high flow of current of up to 500 kA. There is usually no need for electrode cooling in view of the small quantity of heat.

The particular advantage is that on account of the extremely short joining time, there is no significant change to the microstructure or oxidation. A microsection does not reveal any cracks or pores in the region of the joint. This joint can also be used to deliberately transmit mechanical forces from the slide plate to the base body, and can also take into account the different thermal expansion properties of the materials used.

In a preferred configuration of the invention, the slide plate and the base body are locally joined to one another. With a joint of this type, the flow of current which contributes to the heating can be correspondingly controlled in a targeted way.

One of the two joining surfaces, which generally consist of material with a relatively high strength and a relatively low conductivity, in this case of steel, is designed in such a manner that one or more elevations are arranged in the contact region. The elevations, known as projections in the specialist jargon, can be designed as an encircling ring projection which reduces the contact surface area to a minimum. The welding energy and the welding pressure are the most important setting parameters in capacitor discharge welding. These parameters are adapted to the component which is to be welded. In the welding operation, a capacitor battery is charged with a constant current up to the energy required for the welding operation. A welding press moves electrodes onto the component and builds up the welding pressure which is set. Then, the capacitors are discharged, with the result that the welding current flows across the joining partners. In the process, the projections are fused by the passage of current on contact with the joining partner and joined to the latter by the loading pressure. The joining operation is terminated before both joining surfaces come fully into contact with one another. This produces a gap or cavity between the joined parts. Excess molten material can be collected by collecting pockets which are deliberately formed.

It is preferable for the slide plate and the base body to be connected to one another by means of a ring projection which runs around the outer edge region alone or also by way of a centrally arranged ring projection. It is particularly preferable to use a combination of an encircling ring projection in the outer edge region and a centrally arranged ring projection. As a result, in operation, the force which acts on the running surface is deliberately transmitted to the supporting base body. This also allows the different expansion properties of the different materials to be taken into account. The convex bowing of the edge regions which is described in the prior art can even be avoided by using further projections which are adapted to the particular expansion properties on heating.

A further aspect of the invention, with regard to a sliding body, includes the technical teaching whereby the sliding body has a base body and a slide plate with a running surface arranged on the base body, at least the running surface of the slide plate consisting of a nonferrous metal sliding bearing material produced by means of spray compacting, also known as spray forming. Suitable nonferrous metal sliding bearing materials are in particular copper-based alloys.

It is preferable for the nonferrous metal sliding bearing material to consist of a copper-tin-titanium alloy produced by means of spray forming and compacting and comprising 13.5 to 20% by weight of tin, 0.05 to 0.5% by weight of titanium, remainder copper and optionally one or more of the elements selected from the group consisting of silicon, chromium and zirconium up to a total amount of 1.0% by weight, plus inevitable impurities.

In this context, the invention is based on the consideration that tin bronzes of optimized composition which can be produced using the spray forming process are suitable for sliding bodies, with the result that the sliding bodies can withstand higher loads under conditions of use. Macroscopic segregations, as occur in conventional casting processes even above a tin content of 6% by weight, are in practice not observed up to the solubility limit of tin in copper at 13.5% by weight of Sn. The secondary phases which are desirable for tribological applications can only form if the abovementioned solubility limit is exceeded. In this case, in particular at higher tin contents, the alloy may also contain a higher titanium content.

The secondary phase is a delta phase with a tin content of approx. 25% by weight, which is extremely hard. The structure of the base matrix consists of copper and tin dissolved in copper up to the maximum soluble content of approx. 13.5% by weight.

Optional addition of the elements chromium, silicon and zirconium produces finer grains of the alloy during further processing in forming operations.

Producing the running surface material in the form of round discs with a thickness of approximately 5 mm is done by conventional semi-finished product manufacture. For further processing following the spray forming process, the material is hot-pressed, in which operation the rod diameter, depending on the subsequent degree of cold-forming, can be selected already to be near net shape. The cold-forming process allows different states to be set reliably and reproducibly.

An extrusion process and the subsequent cold-forming ensure that the delta phase precipitations are oriented in the forming direction.

Alternatively, it is possible to produce a strip. In this case too, different materials states can be set by adapting the production parameters. The round disks required can then be stamped out of the finished strip.

The microstructures differ depending on whether production is via a press rod or a rolled strip. Whereas in the case of pressed rods the precipitations are arranged perpendicular to the running surface, in the rolled state they are horizontal with respect to the surface. Abrasion of the softer base matrix leads to the formation of a network of cavities which ensure reliable transfer of lubricant.

The base body may consist of steel. Accordingly, the sliding body is formed from a combination of materials which in terms of its sliding properties and its lifespan in use is composed of completely different materials. In this case, the joining process used to produce the combination of materials is particularly important. The steel base body is used to absorb the forces which occur in operation at the running surface.

The advantages achieved by the invention consist in particular in the fact that a high-strength steel base body is used in combination with a lead-free copper material which has been optimized in terms of tribological aspects. Consequently, sliding bodies with excellent tribological and mechanical properties are available for a wide range of applications even with an increasing power density.

In an advantageous configuration of the invention, the copper-tin-titanium alloy of the sliding body may contain 14.0 to 17.0% by weight of tin. As a result, the solubility limit for tin is already exceeded, with the result that the desired secondary phases can form. This relatively tightly selected element content opens up a sufficient process window of variable parameters for tin to produce a high-quality alloy which is reproducible in terms of its materials properties.

The copper-tin-titanium alloy of the sliding body may advantageously contain 0.1 to 0.3% by weight of titanium. Adding titanium increases the density of the alloy. Titanium is in this case able to form nitrides, with the result that the nitrogen used as spraying gas in the spray-forming production process can be bonded as titanium nitride. Levels of over 0.3% by weight in current practice do not lead to any further improvement to the properties of the alloy.

In a preferred embodiment of the invention, the running surface of the sliding body may have a directional two-phase microstructure comprising the copper-tin-titanium alloy.

In a particularly preferred embodiment, the entire slide plate of the sliding body with the running surface consists of the copper-tin-titanium alloy. On account of their preferential sliding properties in combination with corresponding mechanical properties, slide plates of this type satisfy both requirements with regard to tribological and mechanical demands in one.

In a preferred embodiment, the base body may consist of steel. This ensures correspondingly high strengths even in the base body.

The slide plate may advantageously be joined to the base body over its entire surface. Alternatively, the slide plate may advantageously be joined to the base body locally.

In a further advantageous configuration of the invention, the slide plate and the base body may be joined to one another by way of an outer ring projection and/or a centrally arranged ring projection. In this case, reliable joining of base body and slide plate with a low effective heat in the production process is established at the joining surfaces in particular when using the capacitor discharge welding process according to the invention.

Sliding bodies according to the invention of this type can be used as a slipper for hydrostatic piston engines.

Exemplary embodiments of the invention are explained in more detail with reference to a diagrammatic drawing, in which:

DETAILED DESCRIPTION OF THE INVENTION

Figure 1:
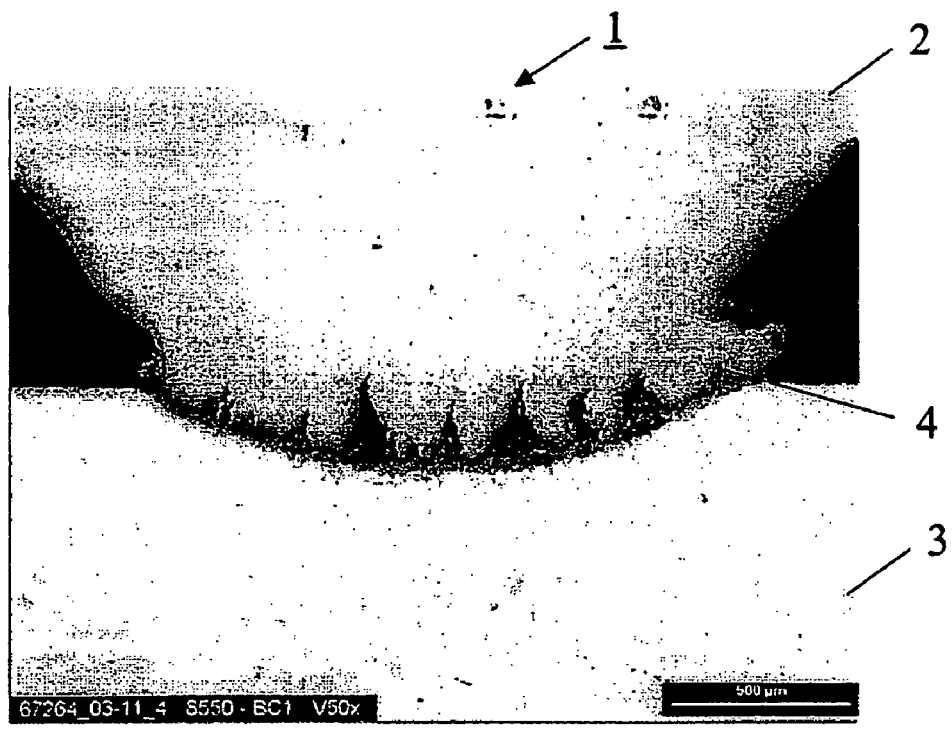
FIG. 1 shows a cross section through the joining surface between a base body and a slide plate.

Parts which correspond to one another are provided with the same reference numerals throughout all the figures.

FIG. 1 shows a cross section through a joining surface 4, which is formed by capacitor discharge welding, between a base body 3 and a slide plate 2 of a slipper 1. The microstructure at the joining surface 4 between the running surface made from the proposed tin bronze and the base body made from steel is scarcely disrupted on account of the low introduction of heat which results from the production process. A tightly locally restricted heat-affected zone is formed only in the range of a few micrometers. The surrounding matrix remains unaffected and there is no drop in the hardness of the material. In this example, the joining surface of the slide plate 2 was designed in such a manner that a "projection" in the contact region reduces the contact surface area to a minimum. The joining operation was interrupted even before the two joining surfaces were in full contact with one another. This produces the cavity between the joined parts, which can hold excess melt.

Figure 2:
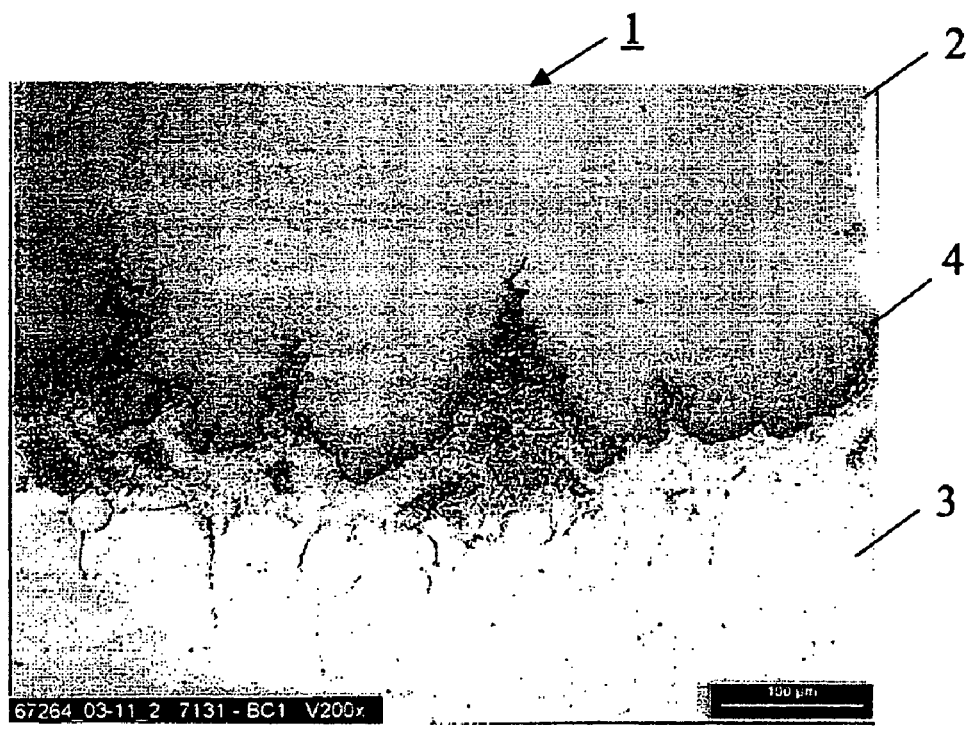
FIG. 2 shows an enlarged excerpt from a joining surface.

FIG. 2 shows an enlarged excerpt from a joining surface 4 of a sliding shoe 1. The capacitor discharge welding method leads to intensive intermeshing of the joining surface 4 between slide plate 2 and base body 3 under the local action of heat. The microsection does not reveal any cracks or pores in the joined region.

LIST OF DESIGNATIONS

1 Sliding body, sliding shoe, slipper
2 Slide plate
3 Base body
4 Joining surface

The invention claimed is:

1. A sliding body comprising a steel base body and a slide plate having a running surface consisting of a nonferrous metal sliding bearing material consisting of a copper-tin-titanium alloy comprising 13.5-20% by weight of tin, 0.05-0.5% by weight of titanium and, optionally, one or more elements selected from the group consisting of silicon, chromium and zirconium in a total amount of up to 1% by weight, with the remainder being copper and inevitable impurities, the slide plate and the base plate being joined together at a contact region by one or more projections with a gap or cavity being provided between the slide plate and the steel base body in the contact region.

2. The sliding body as claimed in claim 1, wherein the copper-tin-titanium alloy contains 14.0 to 17.0% by weight of tin.

3. The sliding body as claimed in claim 1, wherein the copper-tin-titanium alloy contains 0.1 to 0.3% by weight of titanium.

4. The sliding body as claimed in claim 1, wherein the running surface has a directional two-phase microstructure comprising the copper-tin-titanium alloy.

5. The sliding body as claimed in claim 1, wherein the slide plate with the running surface consists of the copper-tin-titanium alloy.

6. The sliding body as claimed in claim 1, wherein the slide plate is joined to the base body substantially over its entire surface.

7. The sliding body as claimed in claim 1, wherein the slide plate and the base body are joined to one another by way of an outer ring projection and/or a centrally arranged ring projection.

* * * * *